Patented July 17, 1951

2,560,633

UNITED STATES PATENT OFFICE 2,560,633

METHOD OF STABILIZING CATALYTICALLY CRACKED FURNACE DISTILLATES AND COMPOSITIONS THEREFOR

Russell F. Stedman, Alma, Mich., assignor to Leonard Refineries, Inc., Alma, Mich., a corporation of Michigan No Drawing. Application May 15, 1951,
Serial No. 226,527

17 Claims. (Cl. 44—72)

This invention relates to a method for stabilizing catalytically cracked furnace oils and other cracked distillates of similar boiling range.

The process of catalytic cracking hydrocarbons has developed rapidly during the past few years. The increase in consumption of domestic furnace oils has given rise to the use of catalytically cracked distillates in addition to the usual straight run and thermally cracked distillates that have been previously used. The treatment of catalytically cracked products involves problems not all of which can be solved by methods effective with corresponding thermally cracked oils. It is with improvements in the art of treating catalytically cracked oils of higher boiling point that the present invention is concerned.

The type of catalytic cracking referred to herein is that in which hydrocarbon oils are contacted in vapor phase with catalysts such as acid treated clays of the bentonite or montmorillonite type, or synthetic silica-alumina type catalysts.

In addition to gasoline and gas, relatively high boiling distillates are produced boiling in the range of about 380° F. to 640° F. and sometimes higher, for example, 720° F. These are largely used as domestic furnace oils and as Diesel fuels.

Such oils tend to become darker during storage and in many instances a sludge may separate after several days or weeks. Sludge formation presents a serious problem since the sludge may clog burner tips, etc., and result in poor operation. Color formation is objectionable largely from the standpoint of marketability since the general public considers a light colored oil as desirable and objects to changes in color during storage. The formation of colors is not necessarily a criterion of sludge formation although in certain instances the two appear to go hand in hand. Conventional methods for protecting straight run or thermally cracked hydrocarbon distillates against color and sludge formation have not been generally found applicable to the catalytically cracked distillates. Color and gum antioxidants used in thermally and catalytically cracked gasoline provide little or no protection for the catalytically cracked furnace distillates. Acid treatment or solvent extraction of the distillates is impractical and uneconomical because of the high losses of distillate entailed. While such treatment may remove objectionable components, certain desirable components are removed as well.

In a broad embodiment the invention relates to a method of preventing color and sludge formation in catalytically cracked oils of the furnace fuel type by adding thereto formaldehyde and an aliphatic monoamine.

In a specific embodiment the invention comprises adding to catalytically cracked furnace distillate an aliphatic monoamine in proportions of about 0.0005 to about 0.1%, and formaldehyde in proportions of about 0.003 to 1.0%, all by weight of the oil.

The corresponding finished fuels are also part of the invention. Catalytically cracked distillates of the character herein described can be stabilized by adding formaldehyde in proportions of about 0.003 to about 1% and preferably from about 0.005 to 0.25% by weight. This method results in increased color stability and decreased tendency toward sludge formation. Several methods of adding the formaldehyde to the oil may be used. One of these is to agitate the oil with an aqueous solution of formaldehyde, also referred to in the art as formalin. From 5% to 100 volume per cent of 38 to 40% formalin may be agitated with the oil at about 60–300° F. and preferably at 100–200° F., following which the aqueous phase is separated from the distillate. According to another method small proportions of solid formaldehyde polymer is dissolved in the oil at a temperature ranging from normal atmospheric, i. e., about 60° F. to about 300° F. The polymer appears to depolymerize and the formaldehyde remains dissolved in the oil. The polymer is used in proportions of about 0.001 to about 0.2% and preferably 0.005 to about 0.1%.

Formaldehyde gas may be dissolved directly in the oil, for example, by generating it from polymerized formaldehyde at a slightly elevated temperature, for example, about 150 to 300° F.

The formaldehyde may also be added in a solvent other than water and which is soluble in the fuel. Such a solvent is methyl alcohol, which should be sufficiently anhydrous to be readily soluble. Ethyl alcohol, preferably anhydrous, may also be used.

It was discovered that other aldehydes do not act in the same way as formaldehyde. For example, benzaldehyde, furfural and acetaldehyde, n-butyraldehyde, n-heptaldehyde, 2 ethylhexaldehyde, cinnamic aldehyde, crotonaldehyde, etc., generally have the effect of increasing the rate of color formation in contrast to the benefits obtained with formaldehyde. Glyoxal and p-dimethylaminobenzaldehyde have similar effects. Even in the few instances where no deleterious effect was obtained, no beneficial effect resulted. This is true either in the presence or absence of the added amines of this invention.

The effect of the formaldehyde is not one of solvent extraction since the dissolved gas itself stabilizes the oil.

The use of formaldehyde is effective, particularly, when the oil is stored at normal storage temperatures in the absence of oxygen. In the presence of oxygen there is sometimes a tendency for the containers or other metal equipment with which the stabilized oil comes in contact to corrode. This is noted particularly in storage containers and is most severe near and above the surface of the liquid.

I have discovered that oils of the character discussed herein can be stabilized against color and sludge formation even more effectively and the corrosive effect can be overcome by using formaldehyde in combination with certain amines. The proportions of formaldehyde are those above set forth. The proportions of amines range from about 0.0005 to about 0.1% and are generally employed at 0.001 to about 0.03%.

Not all of the amines are effective. Those with which this invention deals are the aliphatic primary, secondary, and tertiary monoamines. As will appear more fully hereinafter, aromatic amines such as aniline; benzylamine; the aliphatic polyamines such as ethylenediamine and tetraethylenepentamine are not effective and in fact may accentuate color formation in the oil, particularly oil containing formaldehyde.

The chain length of the aliphatic group or groups attached to the nitrogen may vary over a wide range. Thus, monoamines having 2 to 30 carbon atoms are useful. In the case of secondary and tertiary monoamines, the aliphatic group may be the same or may differ. However, at least one of the groups must have at least two carbon atoms. The amines must be soluble in the distillate and should be normally liquid, having low enough volatility not to vaporize excessively from the oil during normal storage. Among those found useful are triethyl amine, morpholine, primary, secondary and tertiary propyl-, butyl-, amyl-, hexyl-, heptyl-, octyl-, nonyl-, decyl-, dodecyl-amines. Also corresponding amines containing longer aliphatic chains, such as cetyl-, octadecyl-, eicosyl-amines. The aliphatic groups may differ, for example, hexyl-ethyl amine; cetyl-dimethyl amine; hexyl-butyl amine to name a few. Or the chain may be branched as in ethylhexylamine, secondary ethylhexylamine, isobutyl-ethylhexylamine. One or more of the aliphatic groups may contain a substituent group such as hydroxyl, for example dibutyl ethanol amine. In the choice of these, solubility is a factor especially among those with shorter chain lengths in which the hydroxyl group appears. By using a hydroxyl amine of longer chain length, or using a secondary or tertiary hydroxyl amine with one or two relatively long unsubstituted chains, the solubility is increased.

The amines alone, in many instances, possess little or no stabilizing effect on the oil. Even when some improvement is observed, the stabilizing effect of the aliphatic monoamines when used together with formaldehyde is more than additive.

The exact amount of amine used depends upon the oil employed and upon the relative proportion of amine to formaldehyde in the oil. Since oils vary considerably depending upon the source and conditions under which they were produced, it is necessary to empirically test the oil. One method of doing this is to filter a 100 cc. sample into a 4 ounce oil sample bottle, add a strip of 30 gauge steel ⅓ inch wide by 5½ inches long, the strip having previously been polished. The bottle is loosely stoppered and placed in an oven for 24 hours at a temperature of 105 to 110° C. At the end of 24 hours color comparisons are made on Union Colorimeter, being read in terms of the N. P. A. color scale. The oil is examined for sludge and the extent of sludge formation is noted. Corrosion of the strip as indicated by the appearance of rust, pits or discoloration is likewise observed. This test, known as the oven heating test, causes rapid color degeneration and some sludge during the 24 hour period if the oil has a tendency to degrade. It offers a relatively rapid empirical test for oil stability. Those oils which remain color stable and in whch sludge formation or corrosion does not occur have been found in actual storage tests to be satisfactory for periods of several weeks or months which is the normal storage period of oils of this character.

In addition to these tests, certain storage tests were carried out on 5 gallon samples of oil produced in the plant. These are described in the examples.

The formaldehyde may be added as described above, and the amine added simultaneously or subsequently, before or after the fuel is sent to storage. A preferred method is to prepare a solution of the formaldehyde and amine in a miscible solvent such as methyl alcohol. This may be used as a concentrate for example containing 25–50% formaldehyde, preferably 35–45% by weight, and 5% to 10% amine. Generally the weight ratio of amine to formaldehyde, whether used in solvent or otherwise, is about 1:1 to 1:10 and preferably 1:3 to 1:5. The solution may be made by dissolving paraformaldehyde in absolute methyl alcohol or the like.

The data appearing in Table I were obtained on various samples of a catalytically cracked furnace oil from a Michigan crude source. The charging stock to the catalytic cracking plant was a distillate fraction obtained by distillation of a topped Michigan crude oil. The oil was passed over an activated clay type catalyst to produce gasoline and gas, the furnace distillate being recovered as a high boiling fraction. The oil boiled in the range of 380° F. to 460° F. The various samples were obtained at different times during the operation. It is characteristic of the catalytically cracked furnace oils that the stability varies from time to time over a wide range of characteristics. It is important that oils of relatively uniform stability be produced. As the data show, this result can be accomplished by means of the present invention.

It will be observed that the aliphatic monoamines, whether primary, secondary, or tertiary, do not of themselves stabilize the oil in all respects. In certain instances the amines have little or no color stabilizing effect, although in some instances the effect is appreciable. Nevertheless, it is readily seen that the color stabilizing effect of the amine alone is not uniform or predictable and, consequently, in the over-all picture the amines are not satisfactory as color inhibitors. The same conclusion may be reached with respect to sludge formation. In a few isolated instances the amine appeared to inhibit sludge formation, but considering the over-all production picture from day to day, the amines are without value as sludge inhibitors.

By the same token, formaldehyde exerts appreciable color inhibition in most instances and generally has a beneficial effect with respect to sludge formation. In occasional samples, however, the sludge inhibiting effect of the formaldehyde is not sufficient to offer full protection to the oil.

When the aliphatic monoamines are used in conjunction with formaldehyde, color stability is uniformly improved and sludge formation is prevented.

Where formaldehyde was used in the case of oil samples 1 to 4, inclusive, the samples contained the amount of formaldehyde which would dissolve in the oil when shaken with 0.5 volume percent of 39% aqueous formaldehyde solution. This was a commercial solution containing a small amount of methyl alcohol. Comparative tests in which the oil was shaken with an aqueous solution of methyl alcohol with no formaldehyde present showed that the methyl alcohol was without effect for stabilizing the oil.

Samples 5 and 6 were prepared by adding the indicated proportion of the amine and formaldehyde dissolved in methyl alcohol. In the case of samples 5 and 6 approximately 0.04% by weight of formaldehyde was added to the oil in the form of a methyl alcohol solution containing 47 grams of formaldehyde per 100 cc. of solution. Similar results have been obtained when adding a solution of formaldehyde and an aliphatic monoamine dissolved in methyl alcohol.

An additional effect of the amine was noted in connection with the accelerated storage test. Experience has shown that in some instances the samples containing formaldehyde but no amine, are corrosive to metal containers, particularly above the vapor space. When the amine is added together with formaldehyde, corrosion is eliminated.

The use of formaldehyde in this invention is critical. Experiments were conducted using triethylamine and dibutylamine separately with each of the following aldehydes, and it was found that no improvement was obtained other than occasional improvements due to the amine alone. The ineffective aldehydes were n-butyraldehyde, n-heptaldehyde, 2-ethylhexaldehyde, furfuraldehyde, benzaldehyde, cinnamicaldehyde, crotonaldehyde, glyoxal, and P. dimethylamino benzaldehyde.

The aliphatic monoamines are also critical to this invention. Experiments using aromatic tertiary ring type and polyamines together with formaldehyde show that these amines are not effective to stabilize the oil against color and sludge formation. Representative of these are aniline benzylamine, pyridine, ethylenediamine, and tetraethylenepentamine.

Stream samples of catalytically cracked furnace distillate were obtained and stored in 1 gallon cans for a period of five weeks. The raw distillate had an original color of 2 which increased to 3 after five weeks' storage with no corrosion. A sample treated with formaldehyde by shaking the distillate with equal parts of 38% formaldehyde solution had an original color of 2, and the color of 2 after five weeks, but the corrosion of the can especially in the vapor phase was severe. A similar sample treated with formaldehyde and having 0.017% monoamylamine added thereto had an original color of 2, after five weeks was 2— and there was no corrosion of the container. Another sample of raw distillate had an original color of 2 and after five weeks' storage a color of 3—. When treated with formaldehyde solution alone, the color was 2+ and corrosion of the can was severe. A corresponding formaldehyde treated sample containing 0.013% monoamylamine had a color after five weeks of 2+ with no corrosion of the can. A formaldehyde treated sample containing 0.13% monoamylamine had a color after storage of five weeks of 3½ with no corrosion of the can. This indicates that the use of excessive amounts of the amine is to be avoided. Why this effect is obtained is not known, but it demonstrates the necessity for correlating the proportions of the two additives.

Experience on a commercial scale over a period of more than five months has confirmed the beneficial effects to be obtained by means of the process of this invention. In the commercial operation the furnace oil was agitated with an aqueous solution of formaldehyde. The concentration of formaldehyde ranged from about 10% to about 20% by weight of the aqueous solution at a temperature of about 150° F. The aqueous phase was then separated from the oil and brought back to strength by adding an additional 37% aqueous formalin solution. The proportion of formaldehyde amounted to about 0.01% by weight based upon the oil. About 0.002 to about 0.005% of n-dibutylamine was added to the oil containing formaldehyde. It was found that such oil retains its initial color in dark storage for a period of at least several weeks, that there is no sign of sludge formation, and that the oil was not corrosive to iron. More than 200,000 barrels of catalytically cracked furnace oil has been stabilized in this manner with satisfactory results. Commercial experience prior to adopting this invention showed that the oil was color unstable during storage and that sludge formation was encountered. The unstabilized oil begins to depreciate within a matter of days after it is produced. As previously indicated, the stability varies considerably over a period of time. At certain times, for reasons that are not known, the oil would depreciate several color points within a matter of a week or so after it was produced and sludge formation began to occur within a few weeks. In other instances the oil was comparatively stable. However, adoption of the present invention has resulted in the production of a substantially uniform product, which can be marketed within the normal marketing period without undesirable color and sludge formation. This is a substantial advantage. The process has solved a troublesome problem connected with catalytically cracked furnace oils. Experience has shown that the same problem does not exist in the case of straight-run or thermally cracked oils of similar boiling range.

The stabilizing agents should be added to the freshly made oil as soon after it is produced as possible and before it has had appreciable contact with air. Commercially the agents are added immediately after the oil leaves the fractionator and while it is at a temperature of about 125–175° F. When the furnace oil is to be checked for routine control, or where the oil is to be studied for optimum proportions of additive, the stream samples should be protected against contact with air, preferably by blanketing with nitrogen or other inert gas.

TABLE I

*Effect of aliphatic monoamines plus formaldehyde*

| Oil Sample No. | Amine | Per Cent | Orig. Color | 24 hours at 105-110° C. | | | |
|---|---|---|---|---|---|---|---|
| | | | | Color | | Sludge | |
| | | | | No HCHO | Plus HCHO | No HCHO | Plus HCHO |
| 1 | None | 0.0 | 2 | 7+ | 4½+ | Med. | Med. |
| 1 | monobutyl | 0.002 | 2 | 6 | 3½ | tr. | no. |
| 1 | morpholine | 0.005 | 2 | 5- | 3½ | med. | no. |
| 2 | none | 0.0 | 2 | 5 | 4 | tr. | no. |
| 2 | dibutyl | 0.01 | 2 | 5 | 3½ | tr. | no. |
| 2 | tributyl | 0.01 | 2 | 4+ | 2½+ | no. | no. |
| 2 | dibutyl, ethanol | 0.01 | 2 | 4+ | 2½+ | no. | no. |
| 3 | none | 0.00 | 2- | 7- | 7- | heavy | trace. |
| 3 | monoamyl | 0.01 | 2- | 4½ | 2½+ | tr. | no. |
| 4 | none | 0.00 | 2 | 5½ | 7- | med. | tr. |
| 4 | monoamyl | 0.005 | 2 | 5 | 3 | med. | no. |
| 4 | triamyl | 0.005 | 2 | 4 | 3½- | tr. | no. |
| 4 | ethyl, hexyl | 0.005 | 2 | 5 | 3½ | med. | no. |
| 5 | none | 0.0 | 2 | 3½ | | heavy | tr. |
| 5 | triethyl | 0.005 | 2 | 3½ | 2½ | heavy | no. |
| 6 | none | 0.00 | 2 | 5+ | | heavy | med. |
| 6 | dibutyl, ethanol | 0.02 | 2 | 5 | 2½+ | heavy | no. |
| 7 | none | 0.01 | 2 | 6 | 4 | med. | no. |
| 7 | di-N-actyl | 0.01 | 2 | 5 | 3 | tr. | no. |
| 7 | dimethyl, cetyl | 0.01 | 2 | 4½ | 3 | no. | no. |
| 7 | dodecyl | 0.01 | 2 | 5 | 3½ | tr. | no. |
| 7 | monoethylhexyl | 0.01 | 2 | 5 | 3 | tr. | no. |
| 7 | diethylhexyl | 0.01 | 2 | 5 | 3 | tr. | no. |
| 7 | monoeocosyl | 0.01 | 2 | 5 | 3½ | no. | no. |

A series of oven tests were made on a catalytically cracked furnace distillate boiling in the No. 2 fuel oil range. To various portions of this were added 0.01% of several commercial gum inhibitors, some of which are known to be aromatic amino or amino phenolic compounds of the type described in U. S. Patent 1,992,014. The results are shown in Table II.

TABLE II

*Oven tests employing commercial inhibitors*

| Stabilizer Used [1] | Original | NPA Color, 24 hr. | 48 hr. |
|---|---|---|---|
| Paranox 62 | 1½ | 5- | 5 |
| Paranox 105 | 1½ | 4½ | 5 |
| Paranox 441 | 1½ | 4½+ | 5- |
| Paranox 447-A | 1½ | 4½+ | 4½+ |
| Paranox 492 | 1½ | 4 | 4½ |
| UOP #1 | 1½ | 4½ | 5- |
| UOP #4 | 1½ | 5- | 5- |
| UOP #5 | 1½ | 6- | 6- |
| Du Pont #1 | 1½ | 4 | 4½ |
| Du Pont #6 | 1½ | 5- | 5+ |
| Sec. Amylamine | 1½ | 5 | 5+ |
| Stedman Stabilizer [2] | 1½ | 3½ | 3½ |
| Untreated | 1½ | 4½- | 4½+ |

[1] 0.01%.
[2] Triethylamine-formaldehyde.

These tests show that commercial inhibitors known to be effective in cracked gasolines and widely used therein, do not stabilize catalytically cracked furnace distillate, but in some instances actually increase the rate of color formation. The same is true of diamylamine such as is employed by Calcott et al. in U. S. Patent No. 1,940,445. Only the stabilizer of this invention containing both amine and formaldehyde was effective.

An oven test was made on straight run furnace distillate of comparable boiling range and from the same crude oil source as the catalytically cracked distillates employed in the examples. The results showed on change in color and no sludge formation, either in the presence or absence of the stabilizer of this invention. It is concluded that the problem does not exist in this type of fuel. These tests were made because Cook, U. S. Patent No. 2,496,444, employs formaldehyde and other aldehydes in Diesel fuels, but discloses only straight run fuels, and the aldehyde is used for an entirely different purpose, namely to prevent corrosion of injector tips at high temperatures, said corrosion being due to the presence of hydrogen sulfide. Since the problem which the present invention solves does not exist in the case of straight run products, the Cook patent offers no suggestion as to its solution. Moreover, as I have pointed out above, aldehydes other than formaldehyde, and amines other than aliphatic monoamines, are not effective.

This application is a continuation-in-part of my co-pending application, Serial No. 158,613, filed April 27, 1950, now abandoned.

I claim as my invention:

1. The method of stabilizing catalytically cracked furnace distillates which comprises dissolving therein a small proportion sufficient to inhibit color and sludge formation, of each of the following: formaldehyde and an aliphatic monoamine having two to twenty carbon atoms in the aliphatic chain.

2. The process of claim 1 wherein the amine is a primary alkylmonoamine.

3. The method of claim 1 wherein the amine is a secondary alkylmonoamine.

4. The method of claim 1 wherein the amine is a tertiary alkylmonoamine.

5. The method of claim 1 wherein the formaldehyde is present in proportions of about 0.0001 to about 1% of formaldehyde, and about 0.0005 to about 0.1% of the aliphatic monoamine, said percentages being by weight.

6. A fuel comprising essentially a catalytically cracked furnace distillate and a small proportion sufficient to inhibit color and sludge formation, of each of the following materials: formaldehyde and an aliphatic monoamine having 2 to 20 carbon atoms in the aliphatic chain.

7. The composition of claim 6 wherein the amine is a primary aliphatic monoamine.

8. The composition of claim 6 wherein the amine is a secondary aliphatic monoamine.

9. The composition of claim 6 wherein the amine is a tertiary aliphatic monoamine.

10. The method of stabilizing catalytically cracked furnace distillates which comprises dissolving therein a small proportion sufficient to inhibit color and sludge formation, of each of the following: formaldehyde and an aliphatic monoamine having two to six carbon atoms in the aliphatic group.

11. The method of claim 10 wherein the amine is monobutylamine.

12. The method of claim 10 wherein the amine is dibutylamine.

13. The method of claim 10 wherein the amine is tributylamine.

14. The method of claim 10 wherein the amine is a butylamine.

15. The method of claim 10 wherein the amine is monoamylamine.

16. The method of claim 10 wherein the amine is triamylamine.

17. A fuel comprising essentially a catalytically cracked furnace distillate having dissolved therein a small proportion sufficient to inhibit color and sludge formation, of each of the following materials: formaldehyde and an aliphatic monoamine having two to six carbon atoms in the aliphatic chain.

RUSSELL F. STEDMAN.

REFERENCES CITED

The following references are of record in the file of this patent:

UNITED STATES PATENTS

| Number | Name | Date |
|---|---|---|
| 1,377,992 | Le Petit | May 10, 1921 |
| 1,940,445 | Calcott et al. | Dec. 19, 1933 |
| 1,992,014 | Rogers et al. | Feb. 19, 1935 |
| 2,496,444 | Cook | Feb. 7, 1950 |
| 2,496,594 | Moyer et al. | Feb. 7, 1950 |
| 2,496,595 | Moyer et al. | Feb. 7, 1950 |